Sept. 21, 1926.
J. I. MUNCY
1,600,480
TIRE CARRIER
Filed Sept. 6, 1924      2 Sheets-Sheet 1
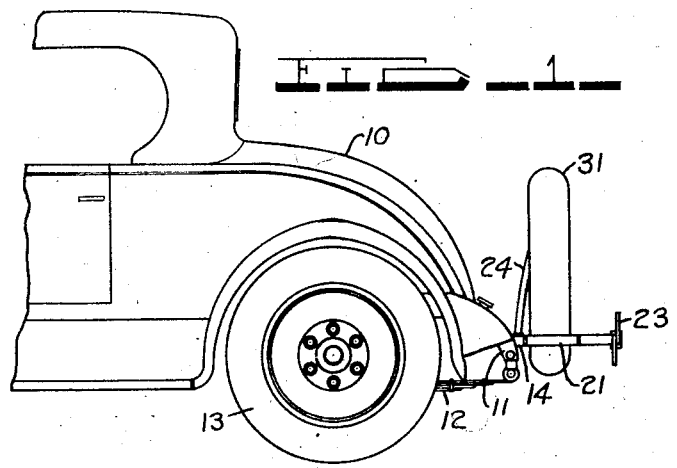
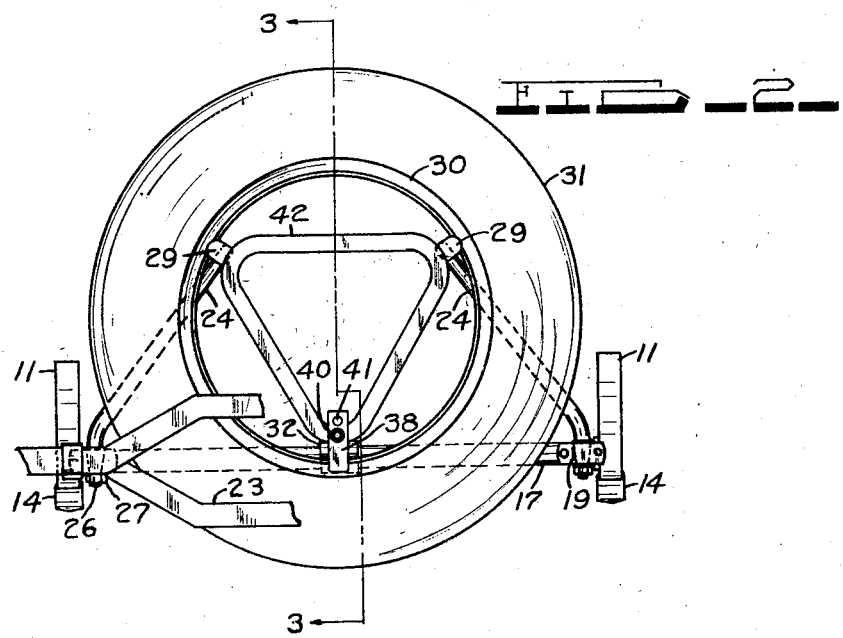
INVENTOR
JOHN I. MUNCY Sept. 21, 1926.  
J. I. MUNCY  
TIRE CARRIER  
Filed Sept. 6, 1924.
1,600,480
2 Sheets-Sheet 2
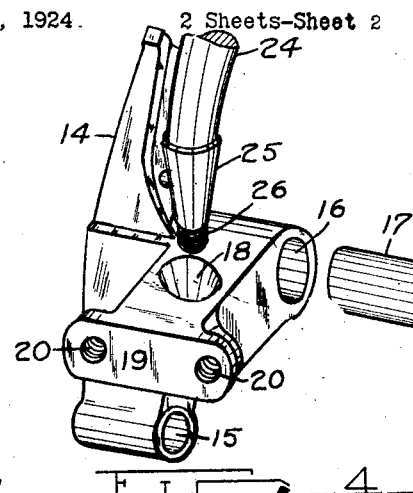
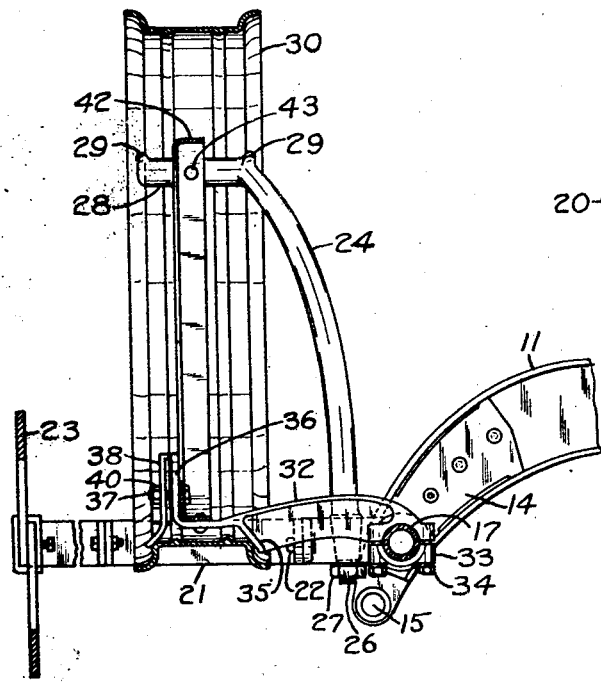
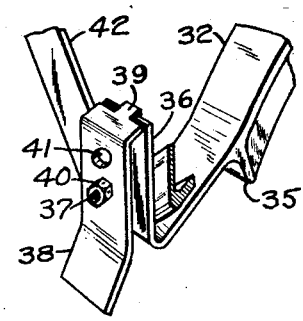
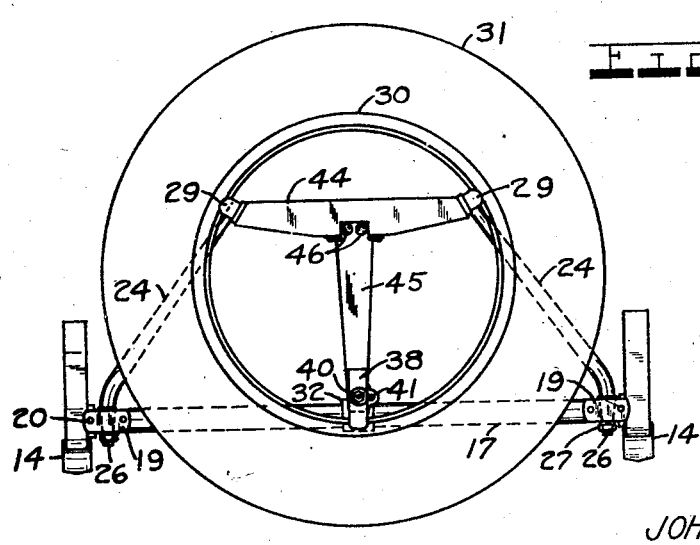
INVENTOR  
JOHN I. MUNCY  
BY  
ATTORNEY Patented Sept. 21, 1926.

1,600,480

UNITED STATES PATENT OFFICE.

JOHN I. MUNCY, OF DETROIT, MICHIGAN, ASSIGNOR TO THE STUDEBAKER CORPORATION, OF SOUTH BEND, INDIANA, A CORPORATION OF NEW JERSEY.

TIRE CARRIER.

Application filed September 6, 1924. Serial No. 736,301.

This invention relates to the means for carrying the spare tires and rims on motor vehicles, and the object is to provide a new and novel device of this class that is simple in construction, efficient in operation, and economical to manufacture.

Another object is to provide a tire and rim carrier, commonly known only as a tire carrier, in which the tire rim is supported at three substantially equidistant points by an arm at each point, the three arms at the points where they receive the rim being suitably braced together by a rigid truss or frame.

Another object is to provide a tire carrier as described above in which two of the three points of support are at the upper portion of the rim when the latter is mounted thereon, the two upper arms taking substantially all of the vertical load of the rim and tire and the third arm acting solely as a stiffening or bracing member for the lever end of the carrier and providing means for locking the tire and rim to the carrier.

A further object is to provide the lower ends of the two supporting arms with tapered ends which are adapted to be received in a tapered socket opening in a combined frame end and bumper bracket support provided on the vehicle which construction provides a simple, effective and neat combination.

The above being among the objects of the present invention, the same consists of certain features of construction and combinations of parts to be hereinafter described with reference to the accompanying drawings, and then claimed, having the above and other objects in view.

In the accompanying drawings which show suitable embodiments of the present invention, and in which like numerals refer to like parts throughout the several views, Figure 1 is a side view of the rear portion of a motor vehicle incorporating a tire carrier embodying the present invention.

Figure 2 is a view of the tire carrier and adjacent parts shown in Figure 1, taken from the rear of the vehicle looking forward.

Figure 3 is a sectional view taken on the line 3—3 of Figure 2, the tire rim only being shown mounted on the carrier.

Figure 4 is a fragmentary perspective view showing the manner of supporting the main tire carrier arms on the vehicle.

Figure 5 is a fragmentary perspective view showing the rim clamping means.

Figure 6 is a view similar to that of Figure 2 showing a modification of the bracing means or frame of the latter.

In the drawings is illustrated a motor vehicle having a body 10, frame 11, springs 12 and wheels 13. Fitting within and secured to the rear end of each of the frame members 11 in a conventional manner is the cast or forged member 14 which serves the following several purposes: It has a downwardly projecting eye portion provided with an opening 15 which receives a conventional spring shackle bolt to which the rear end of the spring 12 is secured; an opening 16 disposed horizontally crosswise of the vehicle which receives and in which is secured the tubular frame cross member 17; an upwardly extending tapered socket opening 18, the purpose of which will be presently described; and a rearwardly projecting vertically extending flat face portion 19 provided with two threaded openings 20. As shown in Figure 3, a bumper bracket 21 is secured by the bolts 22 to each face 19 and extends rearwardly therefrom and a bumper 23, of any suitable design is secured to the rearwardly projecting ends of the brackets 21 by suitable means. Two arms 24, having tapered lower ends 25 which fit into the tapered openings 18 in the members 14, terminate in a threaded end 26 which receives a nut 27 for drawing the tapered end 25 down securely in the opening 18. The arms 24 extend upwardly and inwardly and are provided at their upper ends with a rearwardly extending portion 28 formed with upwardly and outwardly extending lips 29 adapted to engage the side of the tire rim 30 which is received thereagainst. These two arms 24 take substantially all of the load of the rim 30 and its tire 31.

A third arm 32 provided to steady and prevent vibration of the carrier is secured to the center of the tubular cross-member 17 by the cap 33 and screws 34 and extends rearwardly therefrom and is provided with a downwardly and forwardly projecting lip 35 adapted to abut against the lower edge of the rim 30 and form a stop therefor, and an upwardly extending part 36 to which is secured a rearwardly extending stud 37 which receives the clamping bar 38. The clamping bar 38 as shown most clearly in Figure 5 is preferably of pressed metal construction having its lower end bent slightly rearwardly to cause a wedging effect on the rim 30 to draw it down tightly on the lips 29, and its upper end is bent forwardly at right angles to its body and is provided with a tongue 39 which slidably enters a groove in the upper edge of the part 36 and thereby prevents misalignment of the bar 38 with the part 36. The edges of the bar 38 adjacent the tongue 39 abut against the part 36 adjacent the groove and prevent further inward movement of the upper part of the bar 38 so as to obtain the proper clamping effect of the lower part on the rim 30 when the lower part is drawn forwardly by the nut 40 which is threaded on the stud 37. Suitable means, such as an opening 41 in the bar 38 matching a like opening in the part 36 through which a padlock may be passed, are preferably provided for preventing unauthorized displacement of the clamping bar 38 in order to remove the tire 31 and rim 30.

The ends of the three arms 24 and 32 are preferably connected by some means to prevent relative displacement of one in respect to the others, and in Figures 2 and 3 such a means is shown which consists of a continuous triangular angle-iron frame 42 to the vertices of which the arms 24 and 32 are secured by rivets such as 43 or by other suitable means such as welding, etc. It will be observed from Figure 2 that this form of brace gives a triple truss construction to the carrier which consequently embodies it with great rigidity and strength.

In Figure 6 a modification of the triangular frame 42 is shown which consists of a T member having a cross arm or head 44 and a vertical portion 45, the two parts being preferably constructed from sheet metal and being rigidly secured together by rivets such as 46 or by other suitable means. The outer ends of the head member 44 are connected to the ends of the arms 24 and the lower end of the vertical portion 45 is connected to the arm 32 in a manner similar to that used to connect the triangular frame 42 to them as previously described.

It will be apparent from the foregoing that the construction described provides a simple, effective and neat appearing tire carrier that is economical to manufacture.

Formal changes may be made in the specific embodiment of the invention described without departing from the spirit and substance of the broad invention, the scope of which is commensurate with the appended claims.

What I claim is:—

1. In combination with a motor vehicle provided with frame side members and a frame cross member, tire rim supporting arms projecting inwardly and upwardly from said frame side members and terminating in tire rim receiving portions for the upper portion of a tire rim, an arm secured to said frame cross member extending rearwardly therefrom and provided with an angular abutment for the lower portion of said tire rim and an upwardly extending portion provided with a groove and a rearwardly projecting stud, a tire rim clamp bar slidably received on said stud provided with a lower bent rim engaging portion and an upper forwardly extending portion terminating in a tongue for engagement with said groove, means for moving said clamp bar axially on said stud, and a bracing frame extending between and secured to all of said arms.

2. In combination with a motor vehicle provided with frame side members and a frame cross member, a tire rim support and clamp comprising an arm secured to said frame cross member extending rearwardly therefrom and provided with an angular abutment for engaging one side of said tire rim and an upwardly extending portion provided with a groove and a rearwardly projecting stud, a tire clamp bar slidably received on said stud provided with a rim engaging portion and a tongue for engagement with said groove, and means for moving said clamp bar axially on said stud and securing the same thereto.

3. In combination with a motor vehicle provided with frame side members and a frame cross member, tire rim supporting arms projecting inwardly and upwardly from said frame side members and terminating in tire rim receiving portions for the upper portion of the tire rim, an arm secured to said frame cross member extending rearwardly therefrom and provided with an angular abutment for the lower portion of said tire rim and an upwardly extending portion provided with a rearwardly projecting stud, a bracing frame L-shaped in cross section extending between and secured to said upper arms and secured to said second-named arm by said stud, a tire rim clamp bar slidably received on said stud provided with a lower rim engaging portion and an upper portion terminating in a tongue engageable with said upwardly extending portion on said arm, and means for moving said clamp bar axially on said stud and securing the same thereto.

Signed by me at Detroit, Michigan, U. S. A., this 2nd day of September, 1924.

JOHN I. MUNCY.